United States Patent [19]

Tallent et al.

[11] 4,358,426

[45] Nov. 9, 1982

[54] METHOD FOR CLEANING SOLUTION USED IN NUCLEAR FUEL REPROCESSING

[75] Inventors: Othar K. Tallent; David J. Crouse; James C. Mailen, all of Oak Ridge, Tenn.

[73] Assignee: The United States of America as represented by the United States Department of Energy, Washington, D.C.

[21] Appl. No.: 217,357

[22] Filed: Dec. 17, 1980

[51] Int. Cl.³ .................... C01G 43/00; C01G 56/00; C01G 25/00
[52] U.S. Cl. .......................................... 423/10; 423/8; 423/70
[58] Field of Search ........................... 423/8, 10, 70

[56] References Cited

U.S. PATENT DOCUMENTS

| 3,574,532 | 4/1971 | Schulz et al. | 423/10 |
| 3,708,508 | 1/1973 | Schulz | 423/10 |
| 3,949,049 | 4/1976 | Ochenfeld et al. | 423/10 |
| 3,959,435 | 5/1976 | Mills et al. | 423/10 |
| 4,059,671 | 11/1977 | Schmieder et al. | 423/10 |
| 4,162,230 | 7/1979 | Horwitz et al. | 423/10 |
| 4,208,377 | 6/1980 | Horwitz et al. | 423/10 |
| 4,229,421 | 10/1980 | Chapman et al. | 423/10 |

OTHER PUBLICATIONS

Naylor, "U.K.A.E.A. Publication K12-126", Windscale & Calder Works, Sellafield, Seascale, U.K., 1968.
Goldacker et al., "Kerntechnik", vol. 18, 1976, pp. 426-430.

*Primary Examiner*—Herbert T. Carter
*Attorney, Agent, or Firm*—Edwin D. Grant; Stephen D. Hamel; Richard G. Besha

[57] ABSTRACT

Nuclear fuel processing solution consisting of tri-n-butyl phosphate and dodecane, with a complex of uranium, plutonium, or zirconium and with a solvent degradation product such as di-n-butyl phosphate therein, is contacted with an aqueous solution of a salt formed from hydrazine and either a dicarboxylic acid or a hydroxycarboxylic acid, thereby removing the aforesaid complex from the processing solution.

2 Claims, No Drawings

METHOD FOR CLEANING SOLUTION USED IN NUCLEAR FUEL REPROCESSING

BACKGROUND OF THE INVENTION

This invention, which was made under a contract with the United States Department of Energy, relates in general to a process useful in reclaiming spent nuclear fuel, and more particularly, to a method for removing an undesirable chemical complex from an organic solution used to recover an actinide metal from acid in which spent nuclear fuel is dissolved.

To recover usable uranium or plutonium from a nitric acid solution in which spent nuclear reactor fuel elements have been dissolved, the acid solution is contacted with an extractant solution consisting of tri-n-butyl phosphate and a hydrocarbon diluent such as dodecane. The uranium and plutonium in the acid solution combination with tri-n-butyl phosphate of the extractant solution and enter the organic liquid (or phase). The organic phase is subsequently processed to recover the uranium and plutonium therefrom.

Economical considerations require that the tri-n-butyl phosphate and hydrocarbon diluent obtained after the uranium and plutonium have been separated therefrom must be recycled into contact with the aforesaid nitric acid dissolver solution. However, during the described uranium and plutonium recovery process monobutyl phosphoric acid and di-n-butyl phosphoric acid are formed from degradation of tri-n-butyl phosphate, and these compounds then combined with uranium, plutonium, or fission product such as zirconium in the organic extractant solution to form complexes that are not removed from the solvent when the uranium and plutonium are removed. These degradation products would adversely affect solvent performance in the subsequent recycle of the solvent into contact with the nitric acid dissolver solution, and therefore the solvent is washed between cycles to remove them.

PRIOR ART

The formation of contaminants (including di-n-butyl phosphate) in a solution of tri-n-butyl phosphate and its diluent is discussed by A. Naylor in a 1968 U.K.A.E.A. publication K12-126 under the title "TBP Extraction Systems, TBP and Diluent Degradation".

Heretofore sodium hydroxide and sodium carbonate have been contacted with a solution containing tri-n-butyl phosphate, a hydrocarbon diluent, and di-n-butyl phosphoric acid or other degradation product (or a complex of uranium, plutonium, or zirconium therewith), the sodium in these compounds reacting with the aforesaid degradation product or complex to form a water soluble salt that distributes to the wash solution to provide clean solvent for recycle. The spent wash solution is eventually combined with waste solutions containing nitric acid, resulting in conversion of all of the sodium in the system to sodium nitrate. This sodium nitrate, which is produced at a rate of about 0.1 ton-per-ton of fuel reprocessed, causes a serious waste disposal problem.

In an article titled "A Newly Developed Solvent Wash Process in Nuclear Fuel Reprocessing Decreasing the Waste Volume," which was published in Kerntechnik 18, 426 in 1976, H. Goldacker, H. Schmieder, F. Steinbrunn, and L. Stieglitz disclosed that hydrazine or hydrazine carbonate can be contacted with a solution containing tri-n-butyl phosphate, a hydrocarbon diluent, and di-n-butyl phosphoric acid (or a complex of uranium, plutonium, or zirconium with di-n-butyl phosphate) to thereby produce a complex of hydrazine with di-n-butyl phosphate that can subsequently be converted to products that do not cause a waste storage problem. Unfortunately, hydrazine carbonate is unstable and creates storage and handling problems when used to clean a tri-n-butyl phosphate extractant solution. The use of hydrazine alone to remove the above-named material from a tri-n-butyl phosphate/hydrocarbon diluent solution results in the formation of solids which interfere with the separation process.

SUMMARY OF THE INVENTION

It is therefore an object of this invention to provide an improved method for cleaning a metal extracting solution consisting of tri-n-butyl phosphate, a hydrocarbon diluent, and undesirable degradation products of said phosphate.

It is another object of this invention to provide a method for cleaning a metal extracting solution of the above-described composition which produces no material that is difficult to handle or store.

These objects and other advantages are achieved, in accordance with a preferred process embodiment of the invention disclosed herein, by contacting an aqueous solution of hydrazine oxalate or hydrazine oxalate plus hydrazine with an actinide metal extractant solution comprising tri-n-butyl phosphate, a hydrocarbon diluent such as dodecane, and a complex formed by di-n-butyl phosphate or other degradation product with uranium, plutonium, or zirconium.

DETAILED DESCRIPTION

It has been discovered by the inventors that a nuclear fuel reprocessing solution of the above-described type can be effectively cleaned by means of aqueous solutions of salts such as hydrazine oxalate, hydrazine tartrate, hydrazine lactate, and hydrazine glycolate. Each of these salts is formed by reacting hydrazine with either a dicarboxylic acid or a hydroxycarboxylic acid. It should be noted that the organic extractant solution generally used to remove uranium or plutonium from the aqueous nitric acid in which nuclear fuel material is dissolved contains some nitric acid following removal of the actinides from the solvent. Hence it is believed that the following equations represent the reactions that occur when an extractant solution containing tri-n-butyl phosphate (or TBP), a hydrocarbon diluent such as dodecane, a complex formed between an actinide metal and the contaminant di-n-butyl phosphate, and nitric acid is contacted with a hydrazine salt of the above-described type (hydrazine oxalate, uranium, and di-n-butyl phosphate (or DBP) being used as examples of the hydrazine salt, actinide metal, and degradation product which will react as indicated):

$$(N_2H_5)_2C_2O_{4(aq)} + UO_2(DBP)_{2(org)} \rightarrow UO_2C_2O_{4(aq)} + 2(N_2H_5)DBP_{(aq)}$$

$$TBP \cdot HNO_{3(aq)} + N_2H_5OH_{(aq)} \rightarrow TBP_{(org)} + N_2H_5NO_{3(aq)}$$

In these equations, (aq) on the lefthand side of the equations designate the initial aqueous solution and (aq) on the righthand side designates the aqueous phase obtained after this initial aqueous solution has been contacted with the organic extractant solution, the latter being designated by (org). Apparently the hydrazine portion of the hydrazine oxalate in the given example combines with nitric acid and also replaces the actinide metal associated with di-n-butyl phosphate in the organic extractant solution. After the organic extractant solution has been contacted with the aqueous solution of hydrazine oxalate (or one of the other hydrazine salts that can be used in accordance with the invention) and the resultant transfer of an actinide metal from the extractant solution to the aqueous solution has occurred, a solution of tri-n-butyl phosphate and hydrocarbon diluent is obtained that is substantially free of the complex of an actinide metal and di-n-butyl phosphate or other degradation product originally in the extractant solution. This organic phase can be washed with water to remove any hydrazine salt entrained therein, and then it can be recycled into contact with the aqueous nitric acid solution used to dissolve spent nuclear fuel. The aqueous phase containing the substances listed on the righthand side of the equations given above is acidified with nitric acid and contacted with either nitric oxide or nitrogen dioxide to convert the hydrazine portion of the solution to nitrogen and nitrous oxide, which are released in gaseous form. The organic anion portion of the hydrazine salt originally in the aqueous solution ($C_2O_4$ in the above equation) reacts, preferably at temperatures >90° C., with nitric acid to form water, carbon dioxide, and nitrogen dioxide, which are also removable from the aqueous phase by vaporization.

The following table shows results obtained when aqueous solutions of the listed hydrazine salts were mixed with samples of a solution consisting of about 30 volume percent tri-n-butyl phosphate, about 70 volume percent dodecane, and a small amount of the complex formed by uranium and the degradation product of the aforesaid phosphate compound (i.e., di-n-butyl phosphate), the table showing the concentration of uranium in the initial organic extractant solution and in the final organic extraction solution after the aqueous salt solutions were contacted with an equal volume of the extractant solution.

TABLE 1

| Salt solution | pH of Salt Solution | Uranium in Initial Organic Extractant Solution μm/ml | Uranium in Final Organic Solution after Contact with Aqueous Scrubbing Solution μm/ml |
|---|---|---|---|
| Hydrazine oxalate approx. 0.75 normal | 7.0 | 1736 | <10 |
| Hydrazine oxalate* approx. 0.5 normal | 8.03 | 1732 | <10 |
| Hydrazine lactate approx. 0.5 normal | 7.15 | 1737 | 780 |
| Hydrazine lactate* approx. 0.5 normal | 8.00 | 1732 | 32 |
| Hydrazine tartrate approx. 0.5 normal | 7.15 | 1737 | 150 |
| Hydrazine tartrate* approx. 0.5 normal | 8.00 | 1732 | 53 |
| Hydrazine glycolate approx. 0.5 normal | 7.15 | 1737 | 687 |

*Containing sufficient excess hydrazine hydrate to give the indicated pH value

As can be seen from the data given in the above table, the use of aqueous solutions of the oxalate, lactate, tartrate, and glycolate salts of hydrazine effectively remove uranium from the di-n-butyl phosphate complex that is formed in the herein involved organic extractant solution.

Similar testing was done with an irradiated solvent (30% TBP, approximately 70% normal paraffin hydrocarbon) which had been used to process H. B. Robinson-2 fuel dissolver solution and stripped with 0.01 M $HNO_3$ solution in the Oak Ridge National Laboratory Transuranium Facility. Aliquots of the used solvent were equilibrated for 20 min. with equal volumes of either 0.25 M hydrazine oxalate, 0.25 M sodium carbonate, or 0.25 M hydrazine carbonate wash solution after which both phases were sampled. The samples, including samples of the initial solvent were analyzed for uranium, gross alpha activity, and gross gamma activity. The principal alpha emitters identified in the initial solvent were $^{239}Pu$ and $^{238}Pu$; the principal gamma emitters, $^{106}Ru$, $^{110}Ag$, $^{125}Sb$, $^{134}Cs$, $^{137}Cs$, and $^{154}Eu$. The samples were not directly analyzed for di-n-butyl phosphate and mono-n-butyl phosphate; however, the plutonium retention properties in the washed solvents were determined by tests in which 5-ml aliquots of each solvent were equilibrated with one drop of 0.25 M $Pu^{4+}$ – 1.0 M $HNO_3$ solution, washed with equal volumes of 0.01 M $HNO_3$ solution two times, and sampled for retained gross alpha activity.

Any differences in the solvent cleanup effectiveness of the four wash solutions tested are small as can be seen in Table 2 presented hereinafter. The sodium carbonate wash was slightly more effective in gamma activity removal (99% as opposed to 95% for the oxalate washes) while 97 to 98% of the gross alpha activity was removed in each test. The gross gamma and gross alpha count levels remaining in the solvent after washing were, in each instance, approximately $2 \times 10^3$ c/min/ml or less. The plutonium retention test which has traditionally been regarded as a sensitive measure of the presence of di-n-butyl phosphoric acid or deleterious diluent degradation products indicate approximately $4 \times 10^{-8}$ M equivalent di-n-butyl phosphoric acid in the solvent washed with hydrazine oxalate solution assuming the Pu was retained as the 1:1 complex. As with the chemically degraded solvent experiments, it is concluded from these results that there are few, if any, significant differences in the solvent cleanup effectiveness of hydrazine oxalate, hydrazine carbonate, and sodium carbonate washes.

TABLE 2

Cleanup of Irradiated Solvent[a] with Hydrazine Oxalate and Other Wash Solutions[b]

| Wash Solutions | Washed Solvent | | | | Plutonium alpha retention (c/min/ml) |
|---|---|---|---|---|---|
| | Gross gamma[c] (c/min/ml) | Percent removal | Gross alpha[d] (c/min/ml) | Percent removal | |
| Hydrazine oxalate[e] | $1.7 \times 10^3$ | 95 | $1.8 \times 10^3$ | 98 | $1.3 \times 10^3$ |
| Hydrazine oxalate[e] | $1.8 \times 10^3$ | 95 | $2.3 \times 10^3$ | 98 | $7.0 \times 10^3$ |
| Sodium carbonate | $5.0 \times 10^2$ | 99 | $3.0 \times 10^3$ | 97 | Not determined |
| Hydrazine carbonate | $2.2 \times 10^3$ | 94 | $1.7 \times 10^3$ | 98 | Not determined |

[a] Solvent used to process H. B. Robinson-2 fuel dissolver solution and stripped with 0.01 M $HNO_3$ solution.
[b] Solvents were washed with equal volumes of wash solution for 20 min at 25° C.
[c] Initial gross gamma = $3.53 \times 10^4$ c/min/ml.
[d] Initial gross alpha = $1.01 \times 10^5$ c/min/ml.
[e] Duplicate tests.

What is claimed is:

1. A method for removing a complex of uranium, plutonium, or zirconium with mono-butyl phosphate or di-n-butyl phosphate degradation product of tri-n-butyl phosphate in a nuclear fuel reprocessing solution containing said complex, tri-n-butyl phosphate and a hydrocarbon diluent, comprising contacting said solution with an aqueous solution of a salt selected from the group consisting of hydrazine oxalate, hydrazine tartrate, hydrazine lactate and hydrazine glycolate, to thereby obtain (1) an organic phase which contains said tri-n-butyl phosphate and said hydrocarbon diluent and is substantially free of said complex and (2) a spent aqueous phase containing the uranium, plutonium, or zirconium of said complex with the degradation product.

2. The method of claim 1 including the step of contacting said spent aqueous phase with nitric acid and a gas selected from the group consisting of nitric oxide and nitrogen dioxide.

* * * * *